United States Patent
Legg et al.

(10) Patent No.: US 11,152,985 B1
(45) Date of Patent: Oct. 19, 2021

(54) WIRELESS COMMUNICATION FOR VEHICLE BASED NODE

(71) Applicant: BluWireless Technology Limited, Bristol (GB)

(72) Inventors: Peter Jonathon Legg, Bristol (GB); James Simon Pascoe, Bristol (GB)

(73) Assignee: BluWireless Technology Limited, Bristol (GB)

( * ) Notice: Subject to any disclaimer, the term of this patent is extended or adjusted under 35 U.S.C. 154(b) by 0 days.

(21) Appl. No.: 16/931,611

(22) Filed: Jul. 17, 2020

(51) Int. Cl.
| | |
|---|---|
| H04B 7/06 | (2006.01) |
| H04W 36/18 | (2009.01) |
| H04W 76/15 | (2018.01) |
| H04B 7/0408 | (2017.01) |
| H04W 72/04 | (2009.01) |
| H04W 84/00 | (2009.01) |
| H04B 7/022 | (2017.01) |

(52) U.S. Cl.
CPC .......... *H04B 7/0608* (2013.01); *H04B 7/022* (2013.01); *H04B 7/0408* (2013.01); *H04W 36/18* (2013.01); *H04W 72/046* (2013.01); *H04W 76/15* (2018.02); *H04W 84/005* (2013.01)

(58) Field of Classification Search
CPC .... H04B 7/0608; H04B 7/0408; H04B 7/022; H04W 36/18; H04W 76/15; H04W 84/005; H04W 72/046; H04W 28/02; H04W 28/0273; H04W 28/10; H04L 47/10; H04L 47/125
See application file for complete search history.

(56) References Cited

U.S. PATENT DOCUMENTS

| | | | | |
|---|---|---|---|---|
| 9,731,645 | B1* | 8/2017 | Taleb-Bendiab | ............................ G08G 1/096716 |
| 2008/0123529 | A1* | 5/2008 | Lee | ........................ H04W 28/08 370/235 |
| 2010/0106345 | A1* | 4/2010 | Hwang | .................. G07C 5/008 701/2 |
| 2017/0245192 | A1* | 8/2017 | Sadri | ....................... H04W 4/046 |
| 2019/0379435 | A1* | 12/2019 | Kamath | ................. H04W 40/04 |

* cited by examiner

*Primary Examiner* — Ashley Shivers
(74) *Attorney, Agent, or Firm* — Optimus Patents US, LLC

(57) ABSTRACT

A communication system supports communication between an end node of a vehicle and a remote correspondent node via a fixed network which comprises a plurality of wireless access points with a directional antenna arrangement for mm wave radio communication using directional beams. A vehicle comprises wireless modems employing electronically steerable beamforming directional antennas for establishing mm wave radio communication links to the access points. At least one first access point is arranged to transmit atmospheric water content data for an area to the wireless modems. A link management controller of the vehicle is arranged to perform the link management in response to the atmospheric water content data. For example, mm wave radio communication links may be initialized or terminated based on the atmospheric water content data.

18 Claims, 12 Drawing Sheets

WIRELESS COMMUNICATION FOR VEHICLE BASED NODE

FIELD OF THE INVENTION

The invention relates to support of communication with a vehicle based node, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization and in particular air interface resource utilization, improved handover performance, increased over the air communication capacity, improved performance and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; a link management controller located on the vehicle and arranged to perform link management for mm wave radio communication links between the plurality of wireless modems and the plurality of wireless access points; wherein a first access point of the plurality of wireless access points is arranged to transmit atmospheric water content data for an area to at least one of the plurality of wireless modems; and the link management controller is arranged to perform the link management in response to the atmospheric water content data.

The invention may provide improved and/or facilitated operation and/or improved performance for a beamform based mm wave radio communication system supporting (potentially fast) moving vehicles. The approach may, in particular, provide efficient and reliable communication and may in many embodiments provide improved utilization of the available air interface resource. The approach may in many embodiments provide improved consistency and reduced data interruption and/or performance degradation.

The invention may provide improved operation by adapting the communication over the air interface in dependence on the radio environment. The approach may provide a very efficient way of supporting such an adaption.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, controller, and/or end node may be in/on/attached to/move with etc. the vehicle, and may be part of a mobile network that moves with the vehicle.

The link management may be arranged to manage setup and/or termination of mm wave radio communication links between the plurality of wireless modems and the plurality of wireless access points.

In accordance with an optional feature of the invention, the link management is arranged to perform at least one of mm wave radio communication link setup and mm wave radio communication link termination in response to the atmospheric water content data.

The link management may be arranged to perform setup and/or termination for mm wave radio communication links between the access points and the wireless modems.

In accordance with an optional feature of the invention, the link management is arranged to initialize a scanning for access points by at least a first wireless modem of the plurality of wireless modems dependent on the atmospheric water content data.

This may in many embodiments provide a very effective performance and may allow improved flexibility. It may improve adaptation of a trade-off between maintaining current links and pursuing potential new links to different access points.

A scanning for access points may include searching for transmissions from different access points. The searching for transmissions may be used to detect access points that can support setup of a mm wave radio communication link. The detection may include a determination of a radio propagation measure for an access point from which a transmission is detected. An access point may be considered to be able to support setup of a mm wave radio communication link if the radio propagation measure for the access point meets a criterion, such as specifically a radio propagation quality criterion. The scanning may included a search over a plurality of transmission channels. At least some of the transmission channels may have different frequency bands and/or time intervals and/or code division codes and/or identifiers.

In accordance with an optional feature of the invention, the link management is arranged to terminate a mm wave radio communication link between the first wireless modem and a serving access point of the plurality of access points and to initiate the scanning dependent on the atmospheric water content data.

In accordance with an optional feature of the invention, terminating the mm wave radio communication link between the first wireless modem and the serving access point is dependent on whether a further mm wave radio communication link exists between a wireless modem of the plurality of wireless modems and the serving access point.

In accordance with an optional feature of the invention, the link management is arranged to form a new mm wave radio communication link to a second access point of the plurality of access points if the scanning indicates that a radio propagation measure for the second access point meets a selection criterion.

In accordance with an optional feature of the invention, the link management is arranged to increase a bias towards formation of a mm wave radio communication link to an access point not being a closest access point for the atmospheric water content data being indicative of a lower amount of atmospheric water content than for the atmospheric water content data being indicative of a higher amount of atmospheric water content.

In accordance with an optional feature of the invention, the link management is arranged to vary a bias towards formation of mm wave radio communication links to a plurality of different access points in response to the atmospheric water content data.

In accordance with an optional feature of the invention, the link management is arranged to terminate mm wave radio communication links in response to a termination criterion including a distance requirement, and the link management controller is arranged to adapt the distance requirement in response to the atmospheric water content data.

In accordance with an optional feature of the invention, the atmospheric water content data comprises precipitation data.

In accordance with an optional feature of the invention, the atmospheric water content data comprises fog data.

In accordance with an optional feature of the invention, the atmospheric water content data is indicative of an atmospheric water particle density.

In accordance with an optional feature of the invention, the area is an area supported by the first access point.

In accordance with an optional feature of the invention, the area is an area supported by a different access point than the first access point.

In accordance with an optional feature of the invention, the first access point is arranged to transmit atmospheric water content data for a plurality of areas served by different access points of the plurality of access points.

In accordance with an optional feature of the invention, the first access point comprises a circuit for generating the atmospheric water content data from weather data received from a remote weather server via the fixed network.

The remote weather server may be a weather server that is remote from the first access point and with which the first access point may communicate via a network, such as specifically the fixed network.

In some embodiments, the first access point may be arranged to transmit atmospheric water content data to a remote weather server via the fixed network.

According to an aspect of the invention, there is provided a method of operation for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the method comprising: a link management controller located on the vehicle performing link management for mm wave radio communication links between the plurality of wireless modems and the plurality of wireless access points; a first access point of the plurality of wireless access points transmitting atmospheric water content data for an area to at least one of the plurality of wireless modems; and wherein the link management controller performs the link management in response to the atmospheric water content data.

According to an aspect of the invention, there is provided an apparatus for a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the apparatus comprising: a link management controller located on the vehicle and arranged to perform link management for mm wave radio communication links between the plurality of wireless modems and the plurality of wireless access points; a receiver for receiving atmospheric water content data for an area from at least one of the plurality of access points; and wherein the link management controller is arranged to perform the link management in response to the atmospheric water content data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
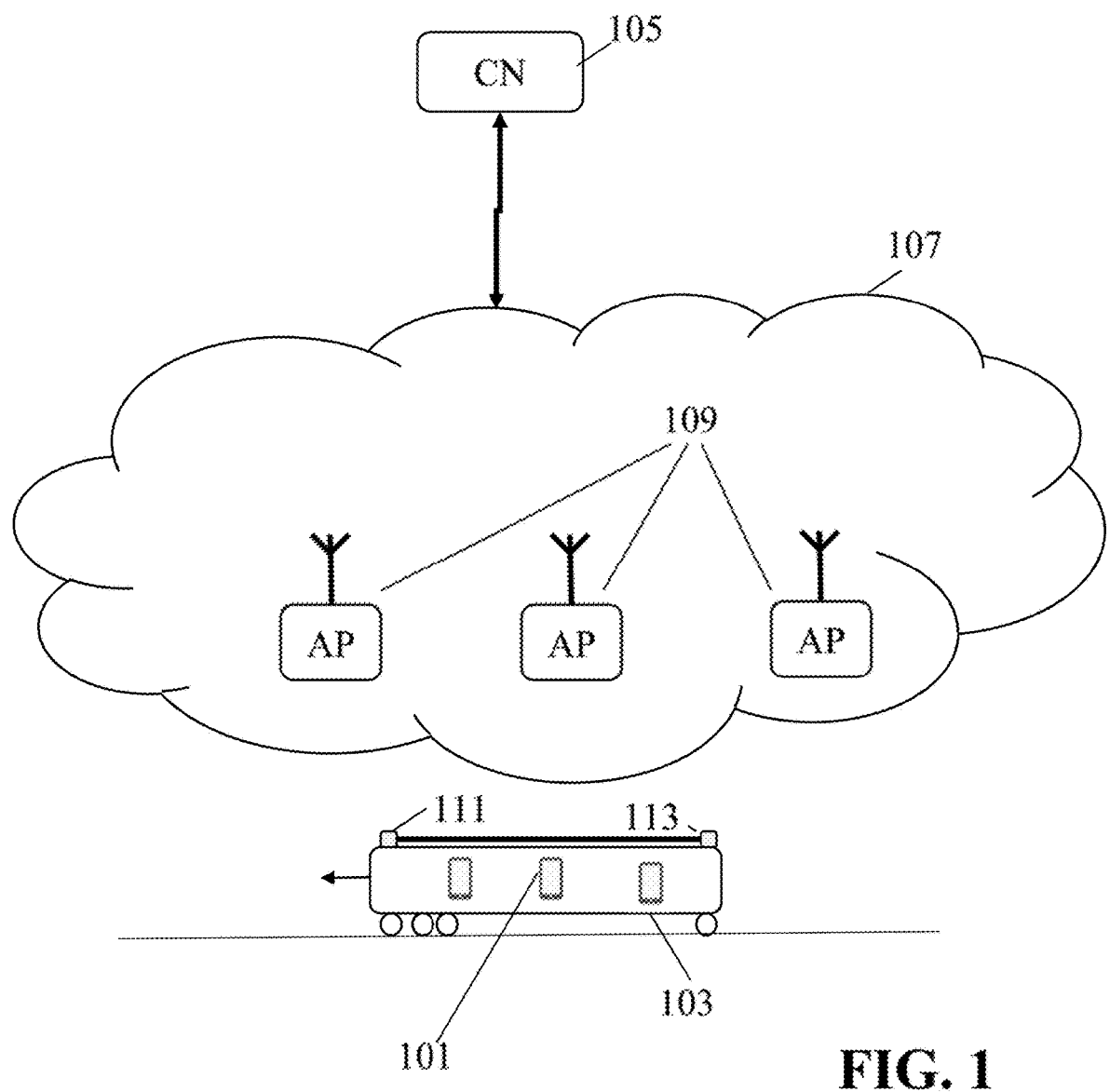
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are in the example individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In a specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train.

Figure 2:
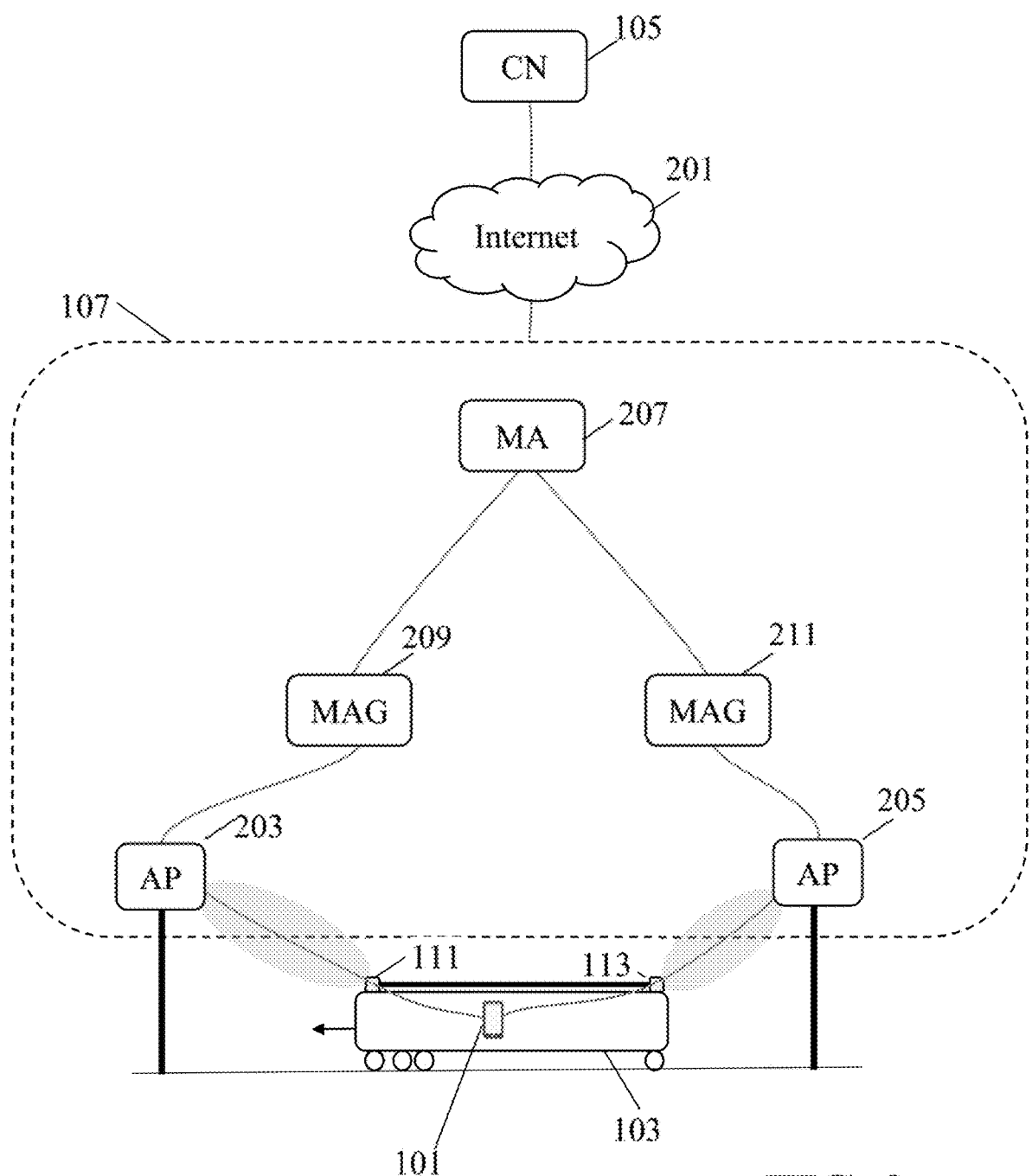
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109, 203, 205 may be substantially colocated and coupled together through network entities that allow short routing paths between them.

Figure 3:
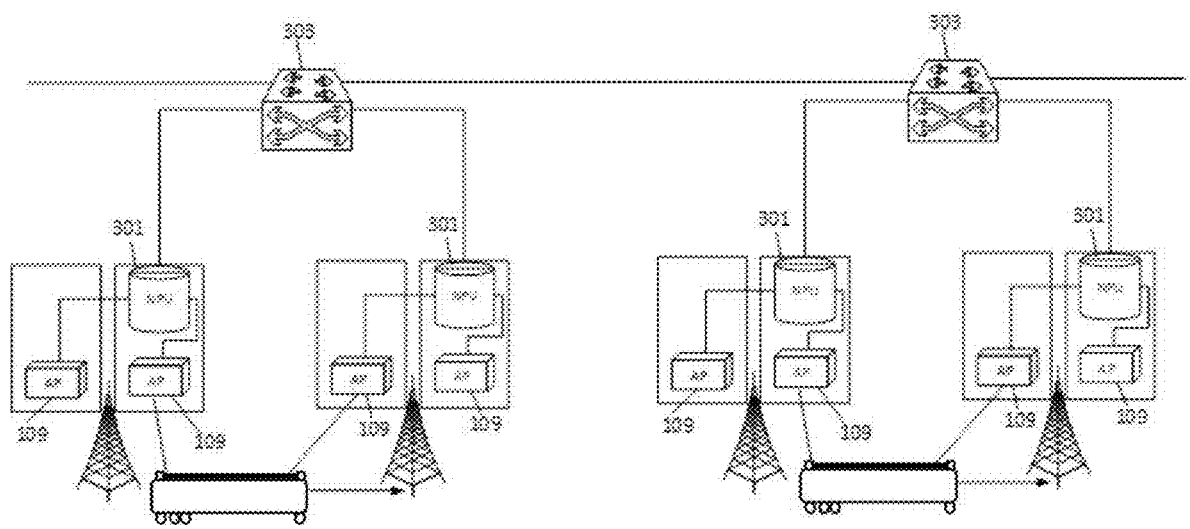
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
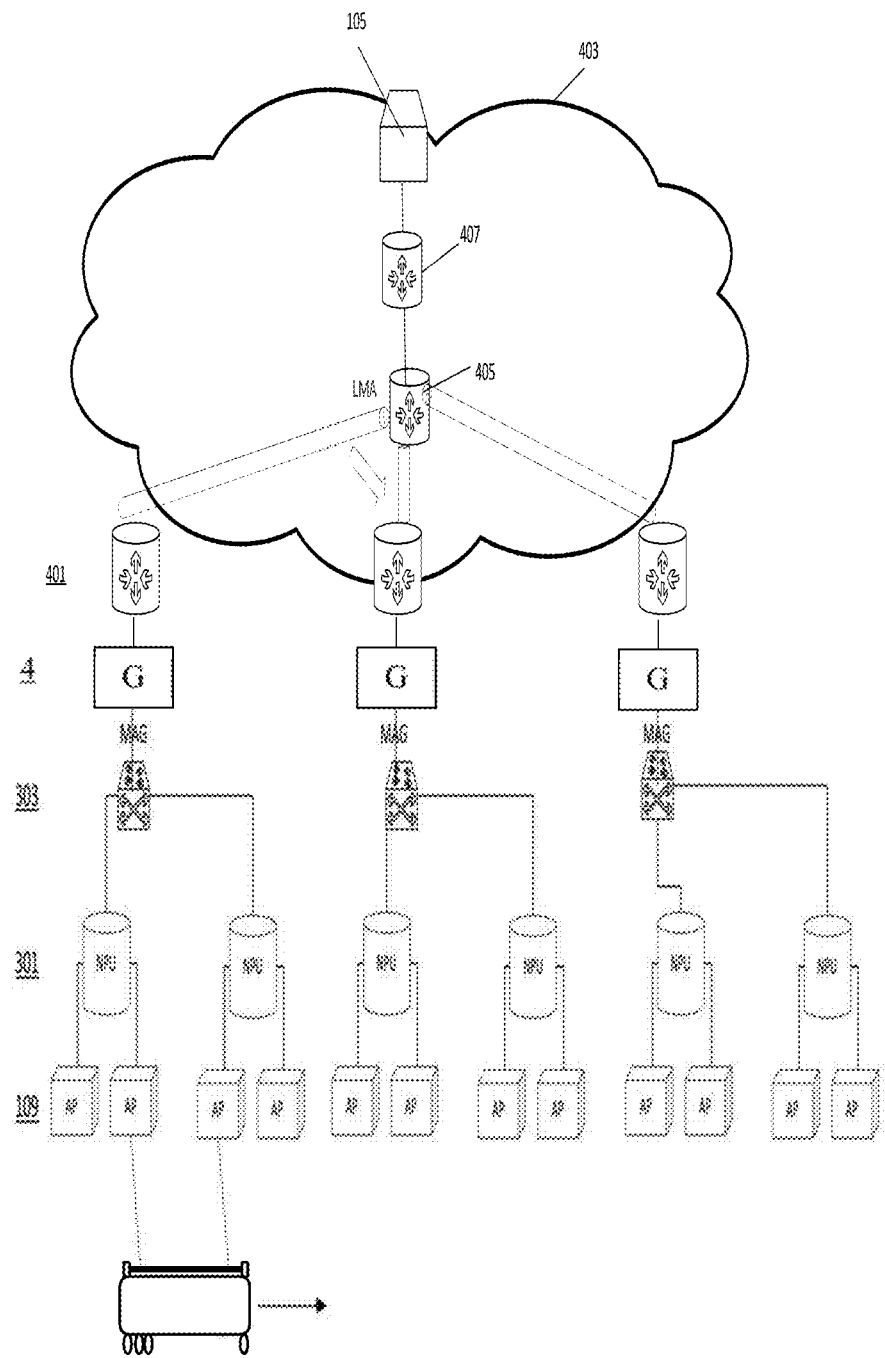
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
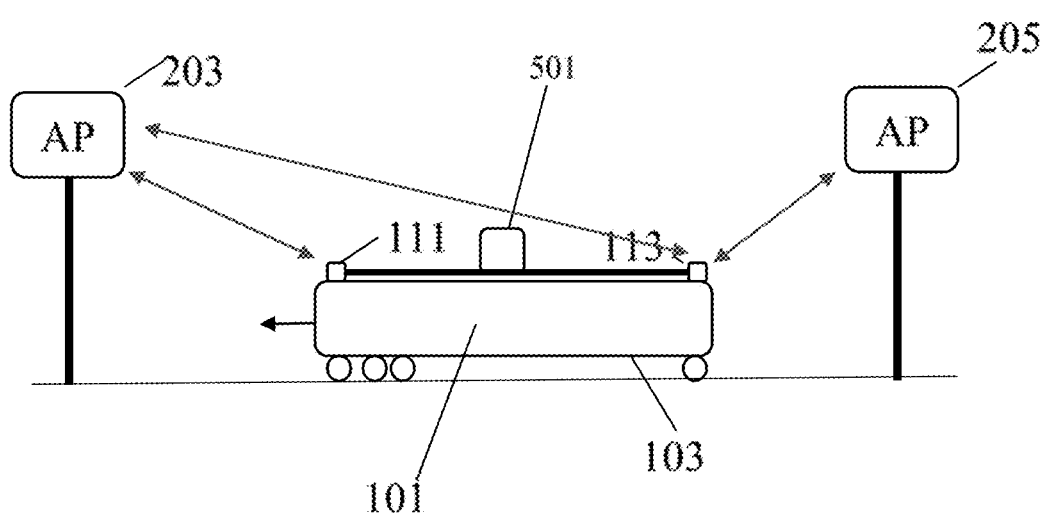
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
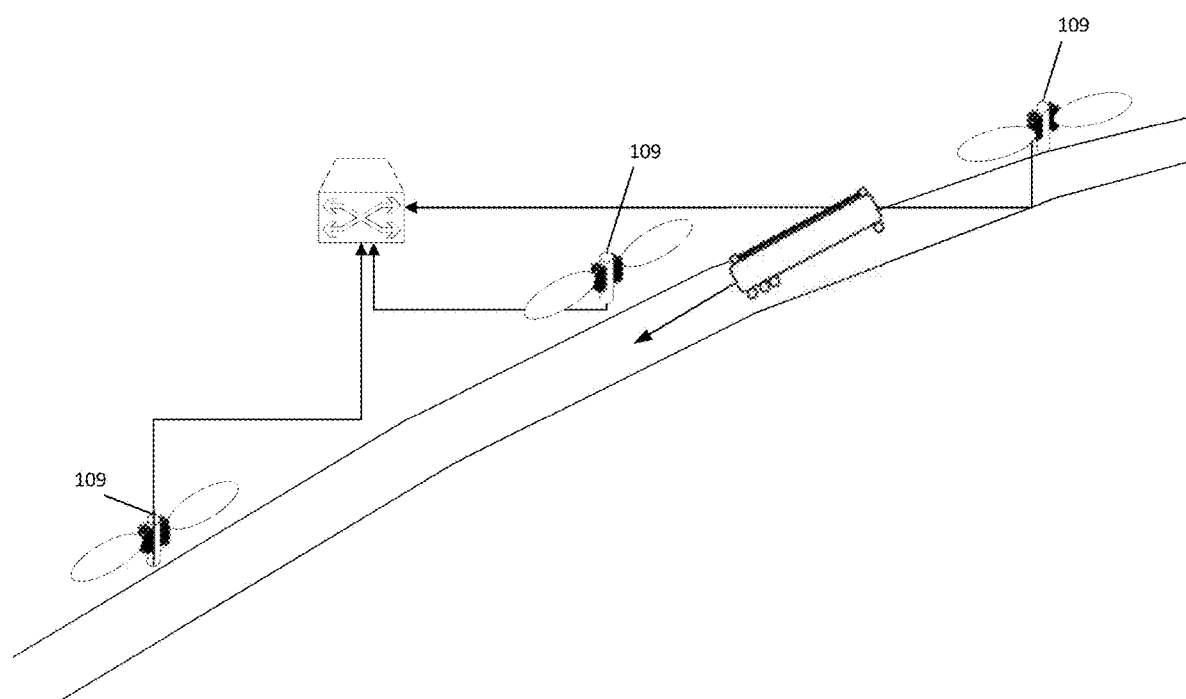
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

Figure 7:
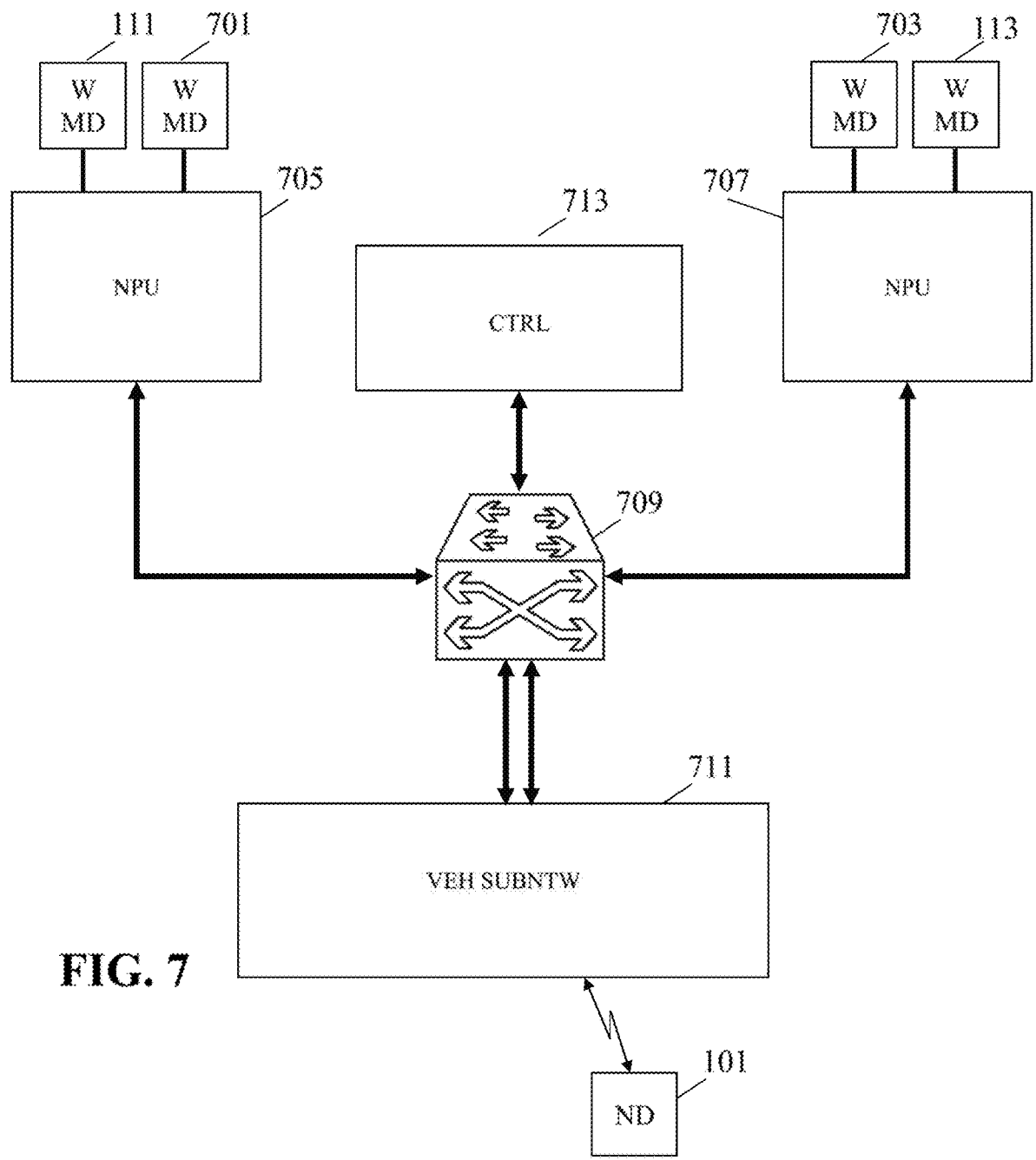
FIG. 7 illustrates an example of elements of a vehicle based network subsystem of a wireless communication system in accordance with some embodiments of the invention.

FIG. 7 illustrates an example of a vehicle network of the vehicle. The vehicle network may include all elements of the communication system which is located on the vehicle/moves with the vehicle.

In the example of FIG. 7, the vehicle network comprises four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a vehicle subnetwork 711 which supports end nodes on the vehicle such that these can interact with the remaining parts of the communication system. The vehicle subnetwork 711 provides access points to the end nodes on the vehicle and allow them to communicate with remote nodes of the fixed part of the communication system via the wireless modems 111, 113, 701, 703, It may in the example provide routes to the wireless modems via the switch 709 and NPUs 705, 709 but it will be appreciated that in other embodiments other configurations may be possible and the vehicle subnetwork 711 may directly be coupled to the wireless modems 111, 113, 701, 703. In the specific example, the NPUs 705, 707 and vehicle subnetwork 711 may specifically be coupled to the switch 709 via Ethernet connections and the switch 709 may be an Ethernet switch.

It will be appreciated that the vehicle subnetwork 711 may include and implement various other network functions including resource control, scheduling and allocation functions, routing adaptation, data session setup functionality etc. The vehicle subnetwork 711 may implement any appropriate network function required or desired for the implementation of a vehicle network that can support vehicle based end nodes and which can communicate and interface with the fixed network and access points.

The vehicle subnetwork 711 may in many embodiments consist in or comprise a Wi-Fi subsystem. The WiFi subsystem may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem may for example be a conventional WiFi system such as an IEEE 802ac (or earlier) system. Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as e.g. in a forwards direction or range of directions and a backwards direction or range of directions respectively.

For example, in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the appropriate access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna phase and amplitude coefficients to direct the main beam towards the relevant access points, e.g. by applying a beam steering algorithm maximizing the received signal strength or signal to noise ratio as is well known in the art. As another example, more mechanical solutions may be used. For example, a horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
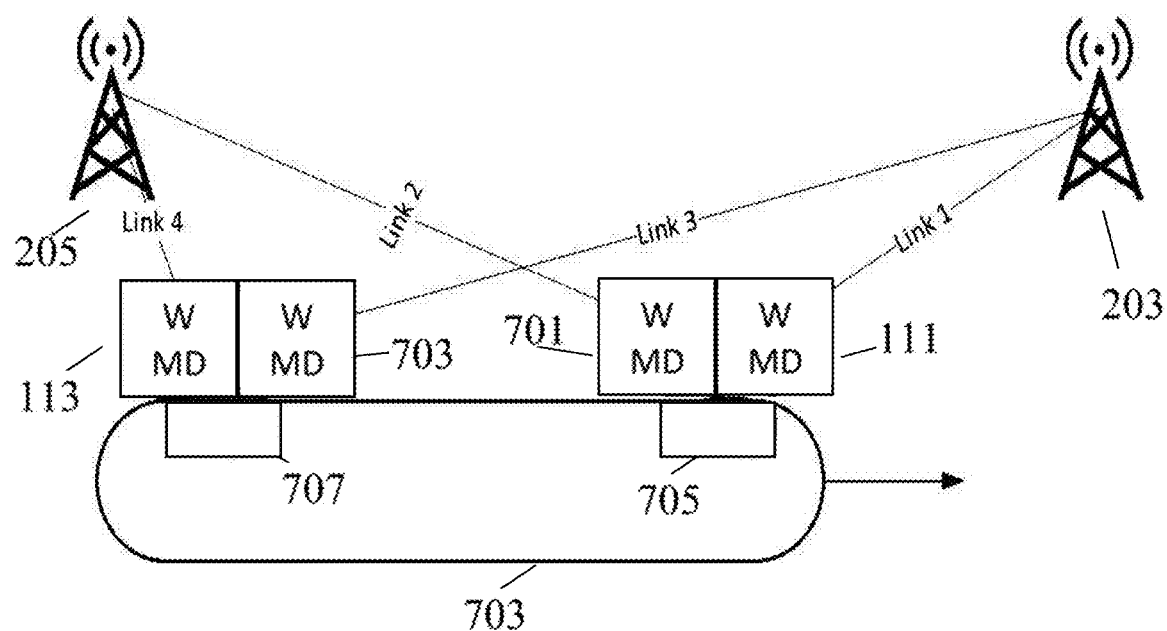
FIG. 8 illustrates an example of elements of a wireless communication system in accordance with some embodiments of the invention.
Figure 9:
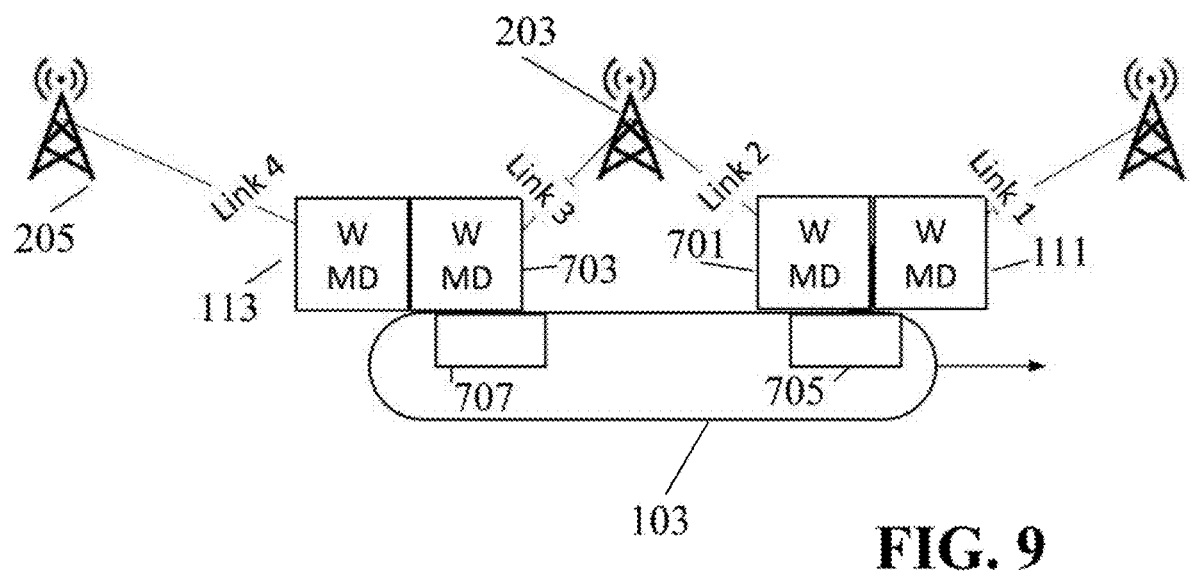
FIG. 9 illustrates an example of elements of a wireless communication system in accordance with some embodiments of the invention.

Similarly, the beam steering may be towards an access point rearwards of the vehicle/train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

The vehicle may typically comprise a plurality of sets of colocated wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding and typically substantially in the same directions will be referred to as aligned wireless modems.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle. In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

As mentioned, a major challenge for mm wave radio communication systems in general, and for systems supporting fast moving vehicles in particular, is that of how to optimize communication over the air interface. The wireless communications and links between the access points and wireless modems are subject to very fast and very substantially changing radio conditions and the communication capacity and reliability that can be achieved is typically constrained by the ability of the system to effectively adapt to the prevailing radio conditions. As described above, this may involve dynamically setting up and tearing down links, adapting scheduling over the established links, adapting beamforms for directional antennas etc. However, further improvement of air interface communication is one of the most highly desired goals when designing and implementing mm wave radio communication systems.

In the described system, improved air interface communication and utilization is achieved by an approach where the access points provide additional information to the vehicle network which comprises functionality for adapting operation in response to this information. Specifically, the Inventors have realized that for mm wave radio communication systems, substantially improved operation can be achieved by implementing functionality for the access points to provide atmospheric water content data to the vehicle network and for the vehicle network to include functionality for modifying the management of links from the wireless modems to the wireless access points based on this atmospheric water content data.

For example, one or more of the access points may be arranged to transmit data that indicates whether it is currently raining or not in the coverage area of the access point, and which may specifically indicate how much rainfall is currently being experienced in the coverage area. The vehicle system may then adapt e.g. the termination and/or formation of radio links between the wireless modems and the access point(s) based on this information.

Figure 10:
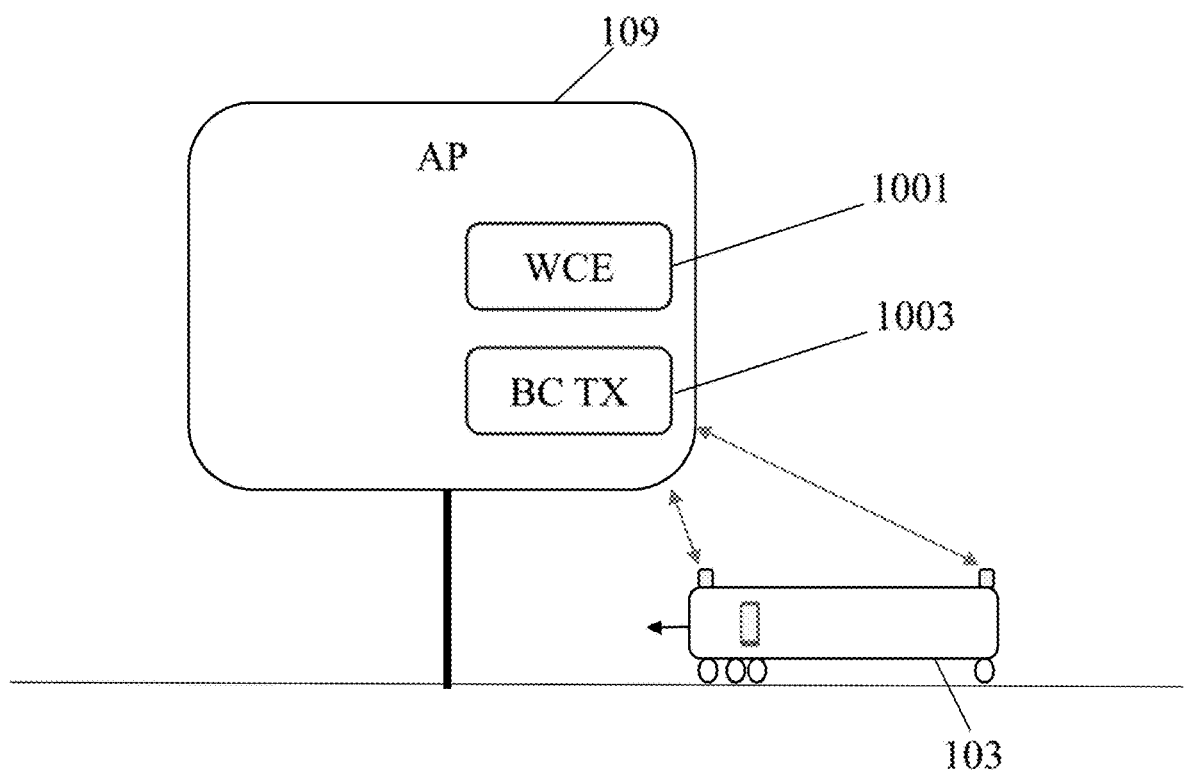
FIG. 10 illustrates an example of elements of a wireless communication system in accordance with some embodiments of the invention.

FIG. 10 shows an example where an access point 109 serving a given area comprises a atmospheric water content data source 1001 which provides atmospheric water content data to a transmitter controller 1003 that transmits the atmospheric water content data over the air interface to the vehicle 103. In the example, the atmospheric water content data may be generated by the atmospheric water content data source 1001, and the access point 109, itself but in other embodiments, the atmospheric water content data may be generated or stored remotely, such as in a network management server, and communicated to the access point 109 at appropriate times.

The transmission of the atmospheric water content data may vary dependent on the preferences and requirements of the individual embodiment. In many embodiments, the atmospheric water content data may be broadcast on a suitable mm wave carrier. In many embodiments, the access points 109 may be arranged to transmit a broadcast beacon signal that can be detected and decoded by all wireless modems entering the coverage area. This broadcast carrier may include various broadcast data, and in some embodiments, the transmitter controller 1003 may be arranged to include the atmospheric water content data in the data broadcast on the beacon carrier. For example, a dedicated field may be included to comprise atmospheric water content data.

In other embodiments, the transmitter controller 1003 may be arranged for the atmospheric water content data to be transmitted to one or more wireless modems as part of a dedicated transmission. For example, the transmitter controller 1003 may detect that a link is in the process of being setup with a new wireless modem (e.g. by detecting that the MAC address of a wireless modem is a new MAC address) and it may proceed to add the atmospheric water content data to a data message transmitted to the wireless modem as part of the link initialization. Indeed, in some embodiments, all link initializations may include the transmission of multipath environment data to the wireless modem for which the link is setup.

Figure 11:
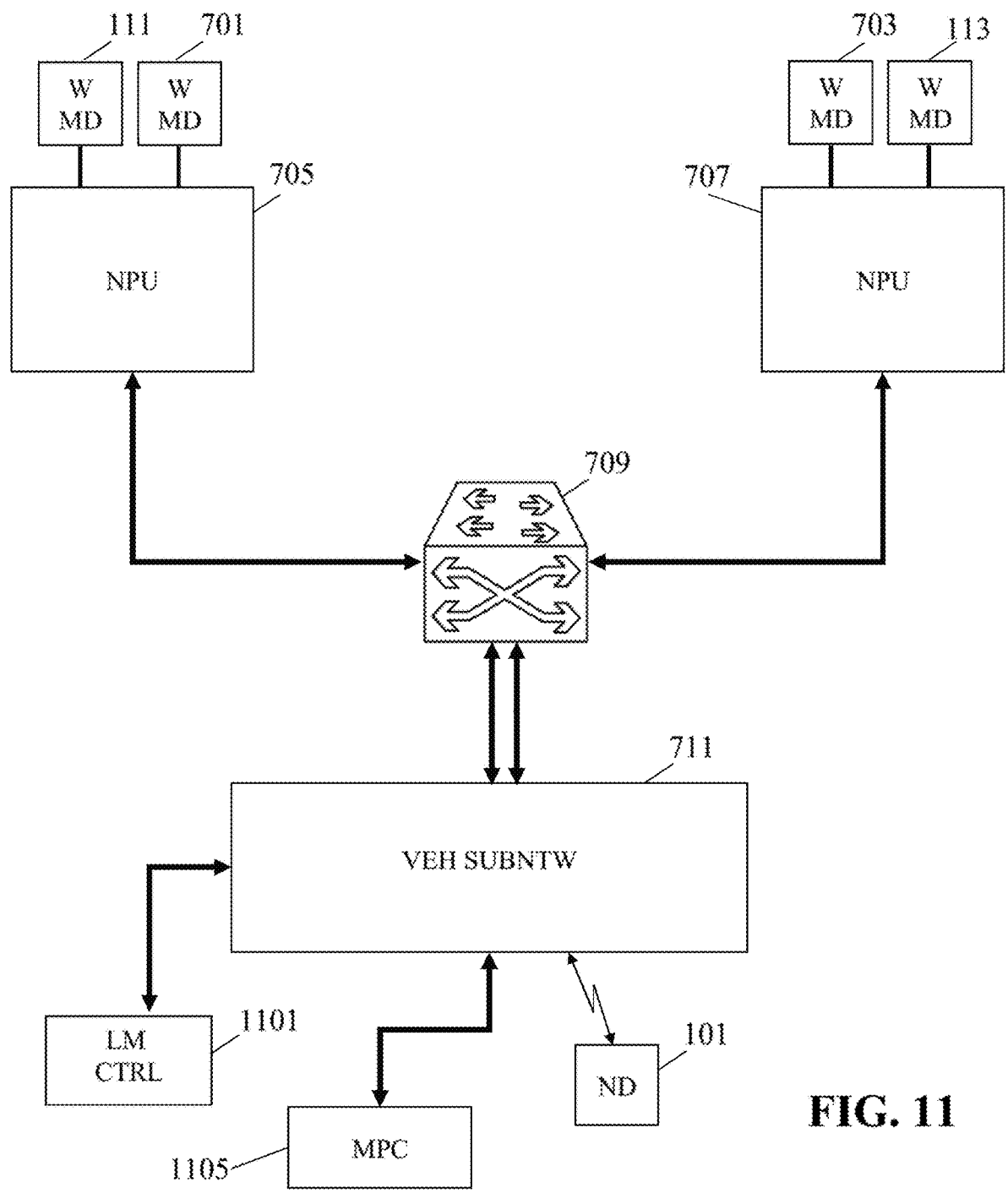
FIG. 11 illustrates an example of elements of a wireless communication system in accordance with some embodiments of the invention.

As illustrated in FIG. 11, the vehicle network may comprise a link management controller 1101 which is arranged to perform link management for mm wave radio communication links between the wireless modems and the wireless access points. The link management controller 1101 is further arranged to receive the atmospheric water content data and to perform the link management dependent on the atmospheric water content data. Thus, the link management controller 1101 may take the atmospheric water content data into account when performing the link management.

Figure 12:
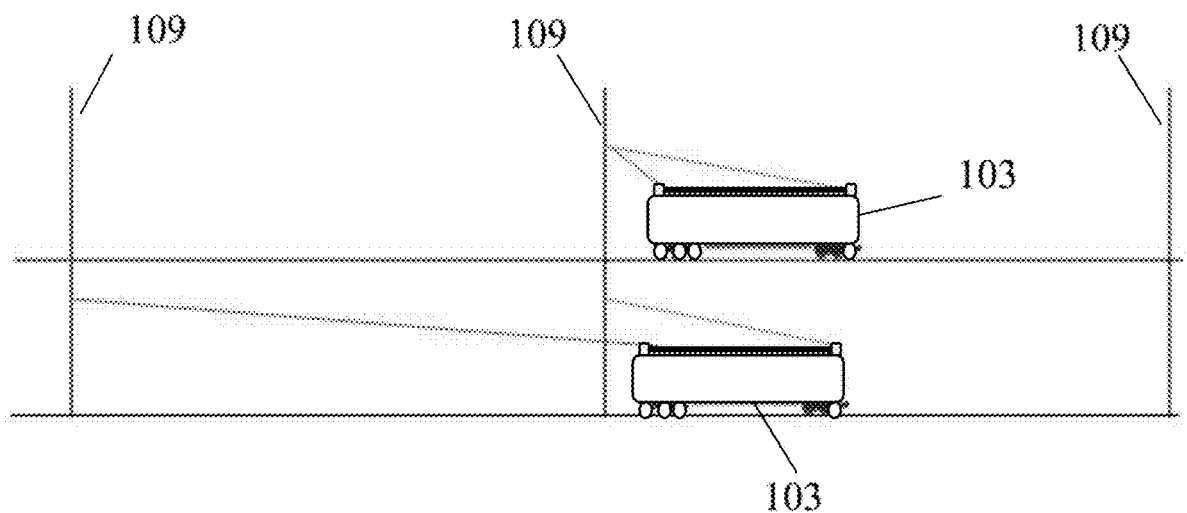
FIG. 12 illustrates an example of a link setup in a wireless communication system in accordance with some embodiments of the invention.

As a specific example, the system may be in a situation where two aligned wireless modems have formed links to the same access point. If the atmospheric water content data provided by this access point indicates that there is heavy rainfall in an area close to the access point and thus there is likely to be a high attenuation of mm wave radio signals to the access point, the link management controller 1101 may be arranged to control the system, and specifically the wireless modems, to seek to establish a link to another access point rather than to maintain two links to the same access point. As another example, if the atmospheric water content data indicates that the current weather conditions in the coverage areas of both this and neighboring access points show no or low amounts of rainfall, it may be likely that communication over longer ranges are likely. Accordingly, the system may drop one of the links to the current access point in order to try to form a new link to a more remote access point thereby providing additional diversity and/or data throughput. An example of the link setup before and after the operation is illustrated in FIG. 12. In the upper part a vehicle has two links to a single access point. The access point then sends atmospheric water content data to the vehicle, and as a result the vehicle determines to drop the link from the modem closest to the access point and for this modem to perform scanning. The scan identifies an additional access point to the one that is nearest to the vehicle, and the vehicle determines that the modem should associate here thereby providing links to two different access points with a resultant improvement in diversity and data throughput.

Specifically, the link management controller 1101 may in such examples control the vehicle system to terminate one of the current links to the access point (e.g. a link from the wireless modem furthest forward in the direction of travel) and to initiate a scan for available access points. If this scan indicates that a second access point is available, the vehicle system may proceed to initialize a new link to this second access point.

If instead the atmospheric water content data indicate that there is no rainfall in the coverage area of the current access point but possibly heavy rainfall in areas covered by adjacent access points, the link management controller 1101 may instead proceed to maintain the current links to the same access point as long as this provides acceptable link conditions (e.g. a sufficiently high throughput and/or low data rate).

As another example, if the atmospheric water content data indicates that there is heavy rainfall in the coverage area of the current access point, the link management controller 1101 may instead proceed to maintain the current links to the same access point as long as this provides acceptable link conditions (e.g. a sufficiently high throughput and/or low data rate).

In the example of FIG. 11, the link management controller 1101 is shown as a separate controller coupled to the vehicle subnetwork 711. However, it will be appreciated that the link management controller 1101 can be considered to be part of the vehicle subnetwork. In the example, the atmospheric water content data may be routed to the link management controller 1101 via a routing function e.g. implemented in the wireless modems and/or the NPUs. For example, the link management controller 1101 may have a MAC or IP address within the vehicle network and a receiving function of e.g. the wireless modems may be arranged to extract the atmospheric water content data and communicate it to the link management controller 1101 using this MAC or IP address. Equivalently, the link management controller 1101 may be arranged to determine a link management operation to perform, such as whether to maintain a link or to scan for a new link, and it may transmit control data to another entity of the vehicle system which is arranged to execute the operation. For example, a link setup/termination function may be implemented as part of the wireless modems, NPUs, vehicle subnetwork, or indeed elsewhere, and the link management controller 1101 may be arranged to transmit control data to such an entity in order to control it to perform the desired operation.

The atmospheric water content data that is being communicated may be different in different embodiments depending on the specific performance that is required or desired.

In many embodiments, the atmospheric water content data includes data that is indicative of a water particle density in the air for the area.

In many embodiments, the atmospheric water content data may specifically be indicative of a water particle density for particles that are larger than a given size. The particles may correspond to droplets) and the atmospheric water content data may be indicative of a water droplet density in the air. Attenuation of mm wave radio transmissions may be particularly sensitive to the presence of water droplets (and drops etc.) in the air. Thus, rather than just comprising e.g. a humidity indication which is indicative of water vapor, the atmospheric water content data may additionally or alternatively include an indication of the water particle/droplet density (e.g. for a minimum estimated size of the particles/drops). The water particle/droplet density may specifically provide an indication to the vehicle system of the density of water particles that may cause scattering of the radio waves resulting in an overall attenuation of the radio signals The effect may specifically reflect that dispersion or scattering of mm wave radio waves occur for water particles such as droplets or larger and the atmospheric water content data may be indicative of the amount of dispersion or scattering of mm wave radio waves caused by water particles in the air.

In many embodiments, the atmospheric water content data may be indicative of precipitation in the area. The precipitation may specifically be indicative of rain, snow, sleet, hail in the area. In particular, the atmospheric water content data may include an indication of the precipitation properties for a weather condition of the area. In many embodiments, the atmospheric water content data may include an indication of a rate of precipitation and may specifically comprise an indication of the amount of water that is falling to the earth per time unit (e.g. per second or minute).

In some embodiments, the atmospheric water content data may comprise weather data for the area, with the weather data comprising (water) precipitation data for the area. Such data is often relatively easily obtainable and provides a highly useful indication of the water related attenuation that may occur.

In some embodiments, the atmospheric water content data may comprise fog data, such as specifically an indication of whether fog is present in the area and possibly how strong the fog is. The strength may in some embodiments be provided by a visual indication, such as e.g. the visibility through the fog. As a specific example, the atmospheric water content data may provide an indication of fog visibility in terms of how many meters of visibility are present. Such information may be relatively easy to determine and measure yet can provide a good indication of water content in the air and of attenuation of mm wave radio propagation.

The atmospheric water content data is thus indicative of water content in the air in the area for which the atmospheric water content data is provided. It may specifically reflect the water content close to ground such as e.g. within 5 m, 10 m, 20 m of the ground. The atmospheric water content data thus in most embodiments provide an indication of atmospheric water content for a volume of air through which (line of sight) mm wave radio communication links are formed between an access point and the wireless modems of the vehicle.

In some embodiments, the atmospheric water content data source 1001 may itself be arranged to generate atmospheric water content data based on local measurements. For example, the atmospheric water content data source 1001 may be coupled to a rain sensor that measures a current rain fall or to a visibility sensor that measures visibility in fog etc. The atmospheric water content data source 1001 may then generate the atmospheric water content data to provide an indication of the rainfall or fog density based on the sensor input. In such a case, the atmospheric water content data will reflect the conditions in an area around the sensor.

In some embodiments, the atmospheric water content data source 1001 may alternatively or additionally be arranged to receive atmospheric water content data from a remote source and may generate the transmitted atmospheric water content data based on the received information. In some embodiments, atmospheric water content data may be received from a remote source in a format that can be transmitted directly to the vehicle, and in other embodiments the atmospheric water content data source 1001 may include some processing of the received data to generate new atmospheric water content data suitable for transmission to the vehicle 103.

As a specific example, in some embodiments, the atmospheric water content data source 1001 may be arranged to receive atmospheric water content data from other access points. Each of these may for example be coupled to local sensors and generate local information for the area covered by the access point. Each access point may generate atmospheric water content data from the sensor input and transmit this to neighboring access points. As another example, the atmospheric water content data may be transmitted to a remote/centralized server e.g. in the fixed network, and neighbor access points may retrieve the data from this centralized server. In this way, each access point may receive atmospheric water content data for its neighboring access points, and may proceed to transmit this data to the vehicle 103. It may further add locally generated atmospheric water content data and thus the vehicle 103 may be provided with information of atmospheric water content data for both the current access point as well as for neighboring access points which may be potential candidates for links from the vehicle 103.

In some embodiments, the atmospheric water content data source 1001 may be arranged to couple to a remote weather server via the fixed network. The atmospheric water content data source 1001 may be arranged to retrieve weather information from the remote weather server and it may be arranged to generate the atmospheric water content data from this received weather information. The weather server may be a generic weather server which is not dedicated to the communication system, and indeed it may be completely independent of the communication system. It may be a generic weather server that is operated to provide weather information to any application that request such data, and it may in many embodiments be a weather server capable of providing localized weather information for different locations. Thus, specifically, the atmospheric water content data source 1001 may retrieve weather data for one or more locations from a remote weather server.

In some embodiments, a remote weather server may be arranged to receive atmospheric water content data from one or more access points and to transmit this atmospheric water content data to other access points. For example, the first access point may generate local atmospheric water content data based on local measurements and transmit this to the remote weather server. A neighboring access point may then retrieve this atmospheric water content data from the remote weather server and may proceed to broadcast the information, e.g. using a beacon transmission. Similar, the neighbor access point may report locally generated atmospheric water content data to the remote weather server, and this may be retrieved by the first access point. Thus, a centralized weather server may be used to distribute atmospheric water content data between access points allowing the individual access point to transmit atmospheric water content data for both itself and for neighboring access points.

The weather data from the weather server may include indications of water content in the air, such as specifically precipitation, humidity, fog etc. The atmospheric water content data source 1001 may then extract and process the relevant data for transmission. As a simple example, the atmospheric water content data source 1001 may request detailed weather data for the area covered by the access point. It may then extract rainfall data from the received data and transmit this to the vehicle.

The access point may transmit atmospheric water content data for an area that is within the coverage area of the access point. The atmospheric water content data may in many embodiments provide atmospheric water content data that is considered to be indicative of atmospheric water content in the entire coverage area, i.e. atmospheric water content data may be provided for the entire coverage area of an access point. However, in some embodiments, the atmospheric water content data may be provided with information indicative of an area that is only a part of the coverage area of the access point. In some embodiments, the atmospheric water content data may include separate atmospheric water content data for different areas within the coverage area. For example, for the vehicle 103 being a train travelling along a train track and the access point being positioned adjacent to the track, separate and individual atmospheric water content data may be provided for the area near the access point and for the area near the access point, and/or the area near the exit point.

In some embodiments, the atmospheric water content data may (additionally or alternatively) include data for an area that is supported by a different access point than the access point from which the atmospheric water content data is transmitted. Thus, the access point may provide atmospheric water content data for all or part of the coverage of one or more other, and typically neighboring, access points. Indeed, in many embodiments, the access point may provide atmospheric water content data for a plurality of other access points including the access point that is transmitting the atmospheric water content data itself.

The transmitted atmospheric water content data may accordingly provide substantial information relevant to the mm wave radio propagation for an access point which may currently provide the best radio propagation conditions but also for other access points that may potentially be able to serve the vehicle 103. The additional information may accordingly be used by the link management controller 1101 to perform improved link management.

The exact link management which is performed by the link management controller 1101 in response to the atmospheric water content data may vary substantially between different embodiments and will depend on the preferences and requirements of the individual embodiment. The additional information on the radio propagation environment provided by the atmospheric water content data may allow the link management controller 1101 to make better informed decisions and to provide improved link management.

In many embodiments, the link management controller 1101 may be arranged to perform link setup and/or termination in response to the atmospheric water content data.

As an example, if the atmospheric water content data indicates that there is a high degree of precipitation in a coverage area of a first access point but not in the coverage area of a second neighboring access point, the link management controller 1101 may be arranged to terminate an active link with the first access point in order to establish a link to the second access point. In some embodiments, such a link termination and setup may be achieved by performing a handover operation between the first and second access points. Thus, in some embodiments, the system may be arranged to perform handovers between access points in response to the atmospheric water content data.

As another example, if the atmospheric water content data indicates that conditions are dry, the link management controller 1101 may consider that the currently experienced range of communications exceed the worst case scenario by a substantial margin. The design of a communication system may often be based on worst case considerations and the distance between access points may be selected such that full coverage to the vehicle is provided even in worst case conditions, such as under heavy rainfall. The inventors have realized that the range of mmWave links varies significantly with the weather conditions, particularly with the rate of rainfall. For example, at a frequency of 67 GHz, the range in dry conditions is approximately twice that under heavy rain (UK, Zone F), For dry conditions, it is thus likely that mm wave radio communication links are possibly not only to the nearest access point but also to one or more neighboring access points. The link management controller 1101 may for example in this case terminate a link to the first access point in order to potentially set up a link to a different access point further away but e.g. in the direction in which the vehicle is known to travel (e.g. further along the tracks for a train). Whilst a link to the more distant access point is likely to have a lower signal strength than that to the current access point, when the vehicle has two modems connected to the current access point, this may give greater throughput to the vehicle because the vehicle modems would not content for air time with the current access point. If instead the atmospheric water content data indicates that there is currently heavy rainfall, the link management controller 1101 may maintain the link to the current (closest) access point as long as this provides acceptable communication.

In some embodiments, link termination and setup may be separate and independent operations from the perspective of the access points, i.e. the termination of the link to the first access point may be performed without any information being provided to the first access point that a second link will be setup to a second access point, and the link to the second access point may be setup without the first access point being aware of this.

Further, in many embodiments, the decision and performing of a link termination may be independent of any decision and setup of a new link, and vice versa. For example, in some embodiments, the link management controller 1101 may simply be arranged to terminate any link to an access point for which the atmospheric water content data indicates that the link will include a rainfall above a given level (or possibly below a given level). The rainfall may be in an area of the access point link, the wireless modem supporting the link, and/or an intervening area between the access point and wireless modem. In many embodiments, the indication may be for the entire coverage area of the access point and thus a link management controller 1101 may e.g. be arranged to terminate any ongoing link to an access point for which the access point indicates an atmospheric water content above (or below depending on the specific desired operation) a given threshold, such as e.g. terminating a link to an access point for which it is indicated that there is very strong rainfall. This may reflect that for a very strong rainfall/water content, attenuation of mm wave radio propagation will be so strong that even if the current conditions are acceptable (e.g. because the vehicle 103 is very close to the access point) then this is likely to change drastically and very soon (e.g. it can be predicted that a moving train will very quickly move out of coverage due to the very high attenuation). Accordingly, it may be advantageous to preempt the imminent degradation to free up resource for trying to establish a new link. Indeed, even if it is not feasible to establish an alternative, it may in some cases be preferable to terminate communication in a controlled manner rather than to wait for a potential total drop-off of the link. This may for example allow information to be communicated to indicate to the applications that a loss of communication is imminent.

Also, in some embodiments, the link management controller 1101 may be arranged to initialize the setup of a new link in response to the atmospheric water content data without necessarily terminating another link. For example, a link may initially be setup with a first access point, and this may currently provide a reliable and high throughput. If the atmospheric water content data indicates that the first access point is covering an area which is dry, no other links may be setup. However, if instead, atmospheric water content data is received which indicates that there is a very high rainfall within the coverage area, the link management controller 1101 may proceed to maintain the current link but may also instigate a new link being setup. This additional link may be with the first access point but will in many embodiments and scenarios be with a second access point. Specifically, if the atmospheric water content data indicates a high rainfall for the access point currently supporting the vehicle 103 but not for a neighbor access point, the link management controller 1101 may proceed to setup a second link to a neighbor access point in order to provide an additional link. This may allow improved link diversity and may result in a more reliable and/or higher throughput over the air communication.

The link management performed by the link management controller 1101 may in many embodiments determine which links to form based on criteria that may consider a number of different parameters. In many situations the current radio propagation characteristics to different possible access points may be determined and used in determining whether to establish a new link and if so to which access point. As an example, in many scenarios, a link to the closest access point is often established as this will tend to provide the best radio propagation conditions. However, the link management controller 1101 may further be arranged to take the atmospheric water content data into account.

Specifically, in some embodiments, the link management controller 1101 may be arranged to take the atmospheric water content data into account and specifically it may in many embodiments be arranged to bias formation of a link towards an access point that is not the closest access point if the atmospheric water content data is indicative of a lower water content than for the atmospheric water content data being indicative of a higher amount of atmospheric water content, in particular for the water content being in an area that is served by the closest access point (and typically for the area in which the vehicle 103 is current present or likely to move into).

Thus, in some embodiments, the likelihood that the link management controller 1101 will cause a link to be formed to a non-closest access point is increased for the atmospheric water content data indicating increasing water content in e.g. the coverage area of the closest access point. This bias may be introduced in determining whether a new link should be set up and if so whether it should be to the closest access point or another access point, or e.g. in determining whether a current link should be handed over to, or replaced by, a link to a neighbor access point.

The atmospheric water content data may thus be used by the link management controller 1101 to bias communications away from a close access point towards a more distant access point if the atmospheric water content data are indicative of drier conditions which are more likely to support longer range communication.

In some embodiments, the link management controller 1101 may be arranged to adapt the link management in response to the atmospheric water content data such that a bias towards formation of mm wave radio communication links to a plurality of different access points is varied in dependence on the atmospheric water content data.

In many embodiments, the link management controller 1101 may typically allow a plurality of mm wave radio communication links to be setup. In some situations, a plurality of mm wave radio communication links may be setup to a single access point and e.g. throughput may sometimes be increased by setting up multiple links from aligned wireless modems to the same access point. However, in other scenarios, the link management controller 1101 may control the setup of multiple links to different access points, for example different wireless modems may setup links to different access points.

In some situations/embodiments, the link management controller 1101 may be arranged to increase the bias towards links being setup with a plurality of different access points for an increasing amount of water content being indicated by the atmospheric water content data. Thus, in such embodiments, the link management controller 1101 may increase the likelihood of links being setup to different access points for increasing indicated water content. For example, rather than setting up two links to the same access point, the link management controller 1101 may in response to an indication of a heavy rainfall proceed to setup links to two different access points. This may possibly reduce the overall throughput rate compared to what can be achieved by two links to the closest access point if there is no significant water related degradation, but will provide increased diversity and therefore often improved throughput when there is substantial water degradation. The approach may accordingly allow the link management controller 1101 to flexibly adapt the link management to provide improved performance for the prevailing conditions.

In some situations/embodiments, the link management controller 1101 may be arranged to increase the bias towards links being setup with a plurality of different access points for a decreasing amount of water content being indicated by the atmospheric water content data. Thus, in such embodiments, the link management controller 1101 may increase the likelihood of links being setup to different access points for decreasing indicated water content. For example, rather than setting up two links to the same access point, the link management controller 1101 may in response to an indication of dry conditions proceed to setup links to two different access points. This may reflect that it may be more likely that effective longer range mm wave radio communication links can be set up to neighboring access points in dry conditions than in wet conditions.

In some embodiments, the link management controller 1101 may be arranged to terminate a mm wave radio communication link in response to a termination criterion that includes a distance requirement. The termination of a link to an access point may specifically include a requirement that the link is only terminated if a distance measure is indicative of distance between the access point and the vehicle being above a given threshold. As another example, any link may regardless of current radio conditions be terminated if it is detected that the distance measure is above a given threshold. Thus, in some embodiments, termination of a link may be subject to a requirement that the distance between the access point and the vehicle exceeds a given first threshold and in some embodiments termination of a link may always occur if the vehicle exceeds a given first threshold (and in some embodiments, both requirements may be included in the link management). Such an approach may specifically be useful for rearwards facing wireless modems.

In such embodiments, the link management controller 1101 may be arranged to adapt the distance requirement in response to the atmospheric water content data. Specifically, it may be arranged to adapt one or both thresholds in response to the atmospheric water content data. As a specific example, the link management controller 1101 may be arranged to reduce the thresholds for the atmospheric water content data being indicative of an increasing amount of water content. E.g. one or more of the thresholds may be reduced when the atmospheric water content data is indicative of a heavy rainfall.

In many embodiments, link management may be based on radio propagation measures for the different access points, such as typically an attenuation, signal strength, and/or signal to noise ratio measure. As a simple example, link management may tend to terminate a mm wave radio communication link when the radio propagation measure indicates that attenuation, signal strength, and/or signal to noise ratio is too low. Similarly, often a link may be initialized with an access point if the radio propagation measure indicates that attenuation, signal strength, and/or signal to noise ratio is above a given level. In many systems, a new link may be formed to the access point for which the radio propagation measure indicates the best propagation conditions.

A suitable radio propagation measure may be relatively easy to determine for an access point with which the vehicle 103 is currently associated, i.e. for an access point for which there is currently a link formed and transmissions are received from the access point. For example, error rates or signal strength measurements can be measured for the received signals.

However, it may be more difficult to determine suitable radio propagation measures for potentially suitable access points with which no link is currently established. However, in many systems, access points transmit beacon signals that can be assessed by wireless modems that are within coverage. In mmWave systems with directional antennae, the beacon transmissions may take place using a directional beam, with the beam direction adjusted after each transmission such that all the intended coverage area is addressed. Thus, a wireless modem can determine a radio propagation measure from the receipt of a beacon transmission from an access point. For example, beacons may be transmitted with a nominal power level and the received signal level may accordingly provide a radio propagation measure that is indicative of the attenuation for a mm wave radio communication link between the access point and the wireless modem. A modem may only attempt to connect to an access point after detection of beacon transmissions from that access point. If the beacon cannot be received from an access point, a connection to that access point is typically not possible.

Thus, a wireless modem may perform a scan of possible transmissions (typically beacon transmissions) from access points and determine a radio propagation measure for detected transmissions. The link management controller 1101 may then perform link management in response to the radio propagation measures. In particular, it may select to setup a new mm wave radio communication link to an access point based on the determined radio propagation measures, and specifically it may select to setup a new mm wave radio communication link to an access point for which the determined radio propagation measure meets a criterion. The criterion may be one that is indicative of a high likelihood that a mm wave radio communication link capable of supporting communication between the vehicle and the access point can be setup. A scan may include monitoring a plurality of possible transmissions channels and determining radio propagation measures for each possible transmission channel for which a transmission has been detected. The transmissions may specifically be beacon transmissions and the possible transmission channels may specifically be beacon channels. Thus, the scan may monitor a plurality of beacon channels and determine radio propagation measures for detected beacon transmissions in the beacon channels.

The scanning may in many embodiments be a sequential scanning but may in some embodiments possibly include parallel evaluations.

In some embodiments, the link management is arranged to initialize a scanning for access points by a first wireless modem of the plurality of wireless modems where the decision to initialize this scanning is dependent on the atmospheric water content data. For example, the link management controller 1101 may continuously evaluate a criterion for whether a wireless modem should perform a scan for potential new access points. For example, the link management controller 1101 may evaluate whether the current links are considered to be of sufficient quality or not. If the quality of one or more current links falls below a given threshold (e.g. measured by signal to noise ratio, signal level, error rate etc.), the link management controller 1101 may initiate a scan in order to detect whether other suitable access points are available.

In some embodiments, the criterion may take the atmospheric water content data into account. Specifically, the quality threshold for triggering a new scan may be increased for the atmospheric water content data being indicative of a higher water content. Thus, for example, the link management controller 1101 may for dry weather conditions proceed to trigger a scan if the quality measure (specifically a radio propagation measure) falls below a given threshold but may for wet weather conditions proceed to trigger a scan only when the quality measure falls below a substantially lower threshold. The approach may thus increase the bias towards initiating a scan for a decreasing level of water content reflecting that in such a case it is more likely that a link to a more remote access point is possible. Thus, the system may be more likely to detect new possible access point candidates for lower water content than for higher water content. The higher threshold may be one that is sufficient for maintaining communication at a high level and which does not by itself require or indicate that there are imminent problems for the support of the vehicle. However, for decreased water content, it may be more likely that such a situation may arise where other potential links are available, and the system may accordingly be biased more towards looking for alternatives.

The approach may thus provide an improved and more flexible scanning operation. The scanning is in many systems a resource demanding operation that may reduce resource available for other operations, including specifically for communication functions. Accordingly, in many systems, scanning operations may have a detrimental effect on the communication performance and accordingly a more flexible scan operation may provide improved trade-off between communication performance and link management.

Indeed, in many typical systems, the same circuitry is required for scanning and for communicating and thus can at a given time only be used for either one or the other. Typically, scanning for access points includes a radio circuit sequentially configuring to monitor for signals on different channels, including on different frequencies. As a consequence, the radio circuit cannot at the same time be used for supporting a communication link, and as it is typically too expensive and complex to have separate dedicated radio circuits for the scanning operation, a given radio circuit will typically be available either for communication or scanning. Further, in many embodiments, the functions are incompatible in the sense that it may be impossible to monitor for relatively weak signals at the same time as a strong signal is transmitted from the wireless modem as part of an ongoing communication.

In many embodiments, the link management controller 1101 may be arranged to terminate a mm wave radio communication link between a wireless modem and a serving access point of the plurality of access points and to initiate the scanning dependent on the atmospheric water content data. In some embodiments, the scanning may be dependent on the atmospheric water content data as previously described (e.g. with an increasing bias towards scanning for the atmospheric water content data indicating a low water content) but in addition the link management controller 1101 may be arranged to terminate an ongoing link in order to free up the resource/circuitry (and specifically radio circuitry) required for the scanning.

In some embodiments, the link management controller 1101 may be arranged to further take into account a current link formation configuration and specifically whether any other mm wave radio communication links are formed from the vehicle 103 or from the wireless modem used for scanning. The link management controller 1101 may specifically take into account whether any other mm wave radio communication links are formed to the first access point.

In many embodiments, the link management controller 1101 may be arranged to terminate a mm wave radio communication link between a first wireless modem and a serving access point in dependence on whether another mm wave radio communication link is formed between a second wireless modem and the serving access point. Specifically, in some embodiments, the link management controller 1101 may control a wireless modem to drop a currently established link to an access point in order to scan for other potential access points. However, the dropping of the link may be subject to there also being another link formed from the vehicle to that access point, i.e. the link may only be dropped if there are two or more links between the vehicle and the serving access point. This may in many embodiments and scenarios provide a more reliable operation and communication.

As a result of the scanning, the wireless modems performing the scanning may generate a set of radio propagation measures (which may be indicative of a potential link quality of a link setup between the wireless modem and the corresponding access point. The radio propagation measures may also be referred to as (potential) link quality measures). The link management controller 1101 may then proceed to setup a new mm wave radio communication link to a new access point for which the scanning indicates that a radio propagation measure/link quality measure meets a selection criterion, such as e.g. that the potential link quality is above a given threshold.

The link management controller 1101 may in this way adapt the trade-off between maintaining current communication capabilities and dropping some of these in order to potentially find more suitable communication options. This adaptation may be made flexibly and dependent on the atmospheric water content data.

As a specific example, when the weather is dry, instead of two wireless modems on the vehicle 103 associating (forming links) to the same access point (e.g. using a point to multipoint approach), one wireless modem can disassociate (terminate the link) and scan for another more distant access point. This could provide two independent links to different access points, instead of two links to the same access point, and thus may provide increased diversity. In many systems, the distance between access points is designed for the worst-case weather scenario (e.g. heavy rain), so in dry and good weather conditions, there is a possibility for coverage overlap between neighbor access points and this may be flexibly exploited by the described approach.

The current description has focused on the link management controller 1101 performing the link management as a centralized function. However, it will be appreciated that the link management controller 1101 may be a distributed functionality and may include functionality of the wireless modems, the vehicle subnetwork etc. Similarly, it will be appreciated that the link management controller 1101 may perform link management by controlling other functions or elements. For example, the link management controller 1101 may initiate a scan operation by transmitting control signals to the wireless modem, or may e.g. terminate or setup a link by transmitting control signals to e.g. the wireless modems which may then proceed to perform the necessary steps.

In some embodiments, the link management controller 1101 may be arranged to adapt a set of transmission channels being scanned in response to the atmospheric water content data. Specifically, the link management controller 1101 may be arranged to adapt a set of frequencies being scanned in response to the atmospheric water content data.

For example, if the link management controller 1101 receives atmospheric water content which indicates that the current conditions are not heavy rain, the vehicle may determine to drop the link from the wireless modem closest to the access point in order for this modem to perform scanning. However, it may further proceed to scan a set of beacon channels and/or frequencies that is different from the set of channels/frequencies that would be scanned if atmospheric water content data had not been received indicating that there is no heavy rain or if instead atmospheric water content data had been received indicating heavy rain. For example, a set of nominal scanning frequencies may be supplemented or modified in the specific scenario where the atmospheric water content data indicates that dry conditions prevail.

Specifically, the scan may be amended to include (beacon) frequencies that are shifted in frequency from the frequencies that are scanned when heavy rain is indicated. The frequency shift may be such that the scan will not include the frequencies of the nearest access point but only frequencies of access points further down the track. Thus, the scan may identify an additional access point to the one that is nearest to the vehicle, and the link management controller 1101 may determine that the wireless modem should associate to this thereby providing links to two different access points with a resultant improvement in diversity and data throughput.

The system may employ a frequency shift method where the carrier frequency (specifically of beacon frequencies) is deliberately offset by an amount smaller than the occupied bandwidth of the carrier. This may, for example, for a train application, reduce the interference impact from an access point that points the same way down the track as the access point currently serving a modem. This method is most useful when the range is greatest, i.e. for dry conditions, since this results in greatest interference. At the same time, it is preferable for the modem to not scan two channels unless absolutely necessary (e.g. normally the wireless modem may just scan one channel, say channel 5) since the modem may not be connected whilst scanning. As an example, in some systems there may be an adaptive configuration of the access points. For example, an access point may use channels 5 and 6, depending on orientation, in wet conditions, and channels 5,5*, 6 and 6*, where * indicates the addition of a frequency shift or offset, in dry conditions. The link management controller 1101 may in some embodiments be arranged to adapt the scanning accordingly Thus, in some embodiments, one or more of the access points may be arranged to adapt a set of beacon frequencies depending on atmospheric water content properties and the link management controller 1101 may be arranged to adapt the set of frequencies scanned in response to the atmospheric water content data. The atmospheric water content data may in such embodiments be indicative of the atmospheric water content properties used to control the beacon transmission operation.

As described in various examples above, the atmospheric water content data may be provided for an area served by the access point transmitting the atmospheric water content data and/or for an area served by another access point. For example, the atmospheric water content data may include both water content data for the access point itself as for neighboring access points. The link management controller 1101 may thus take atmospheric water content data for different access points into account when adapting the link management. For example, it may introduce a bias towards access point selection that increases for an indication of reduced water content for that access point.

In many embodiments, the atmospheric water content data may be indicative of current conditions, such as e.g. whether it is currently raining etc. However, in some embodiments, the atmospheric water content data may alternatively or additionally be indicative of future atmospheric water content. For example, the atmospheric water content data may indicate whether it is considered that rain is likely to start imminently or e.g. whether current rainfall is likely to be short term and to stop shortly.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle and a remote correspondent node via a fixed network, the communication system comprising:
   a plurality of wireless access points of the fixed network, each wireless access point having a directional antenna arrangement for mm wave radio communication using directional beams;
   a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links;
   a link management controller located on the vehicle and arranged to perform link management for mm wave radio communication links between the plurality of wireless modems and the plurality of wireless access points;
   wherein
   a first access point of the plurality of wireless access points is arranged to transmit atmospheric water content data for an area to at least one of the plurality of wireless modems; and
   the link management controller is arranged to perform the link management in response to the atmospheric water content data.

2. The communication system of claim 1, wherein the link management is arranged to perform at least one of mm wave radio communication link setup and mm wave radio communication link termination in response to the atmospheric water content data.

3. The communication system of claim 1, wherein the link management is arranged to initialize a scanning for access points by at least a first wireless modem of the plurality of wireless modems dependent on the atmospheric water content data.

4. The communication system of claim 3, wherein the link management is arranged to terminate a mm wave radio communication link between the first wireless modem and a serving access point of the plurality of access points and to initiate the scanning dependent on the atmospheric water content data.

5. The communication system of claim 4, wherein terminating the mm wave radio communication link between the first wireless modem and the serving access point is dependent on whether a further mm wave radio communication link exists between a wireless modem of the plurality of wireless modems and the serving access point.

6. The communication system of any of claim 3, wherein the link management is arranged to form a new mm wave radio communication link to a second access point of the plurality of access points if the scanning indicates that a radio propagation measure for the second access point meets a selection criterion.

7. The communication system of claim 1, wherein the link management is arranged to increase a bias towards formation of a mm wave radio communication link to an access point not being a closest access point for the atmospheric water content data being indicative of a lower amount of atmospheric water content than for the atmospheric water content data being indicative of a higher amount of atmospheric water content.

8. The communication system of claim 1, wherein the link management is arranged to vary a bias towards formation of mm wave radio communication links to a plurality of different access points in response to the atmospheric water content data.

9. The communication system of claim 1 wherein the link management is arranged to terminate mm wave radio communication links in response to a termination criterion including a distance requirement, and the link management controller is arranged to adapt the distance requirement in response to the atmospheric water content data.

10. The communication system of claim 1, wherein the atmospheric water content data comprises precipitation data.

11. The communication system of claim 1, wherein the atmospheric water content data comprises fog data.

12. The communication system of claim 1, wherein the atmospheric water content data is indicative of an atmospheric water particle density.

13. The communication system of claim 1, wherein the area is an area supported by the first access point.

14. The communication system of claim 1, wherein the area is an area supported by a different access point than the first access point.

15. The communication system of claim 1, wherein the first access point is arranged to transmit atmospheric water content data for a plurality of areas served by different access points of the plurality of access points.

16. The communication system of claim 1, wherein the first access point comprises a circuit for generating the atmospheric water content data from weather data received from a remote weather server via the fixed network.

17. A method of operation for a communication system supporting communication between an end node of a vehicle and a remote correspondent node via a fixed network, the communication system comprising:
   a plurality of wireless access points of the fixed network, each wireless access point having a directional antenna arrangement for mm wave radio communication using directional beams;
   a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links;
   the method comprising
   a link management controller located on the vehicle performing link management for mm wave radio communication links between the plurality of wireless modems and the plurality of wireless access points;

a first access point of the plurality of wireless access points transmitting atmospheric water content data for an area to at least one of the plurality of wireless modems; and wherein the link management controller performs the link management in response to the atmospheric water content data.

18. An apparatus for a communication system for supporting communication between an end node of a vehicle and a remote correspondent node via a fixed network, the communication system comprising:

a plurality of wireless access points of the fixed network, each wireless access point having a directional antenna arrangement for mm wave radio communication using directional beams;

a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; the apparatus comprising a link management controller located on the vehicle and arranged to perform link management for mm wave radio communication links between the plurality of wireless modems and the plurality of wireless access points;

a receiver for receiving atmospheric water content data for an area from at least one of the plurality of access points; and wherein the link management controller is arranged to perform the link management in response to the atmospheric water content data.

* * * * *